UNITED STATES PATENT OFFICE.

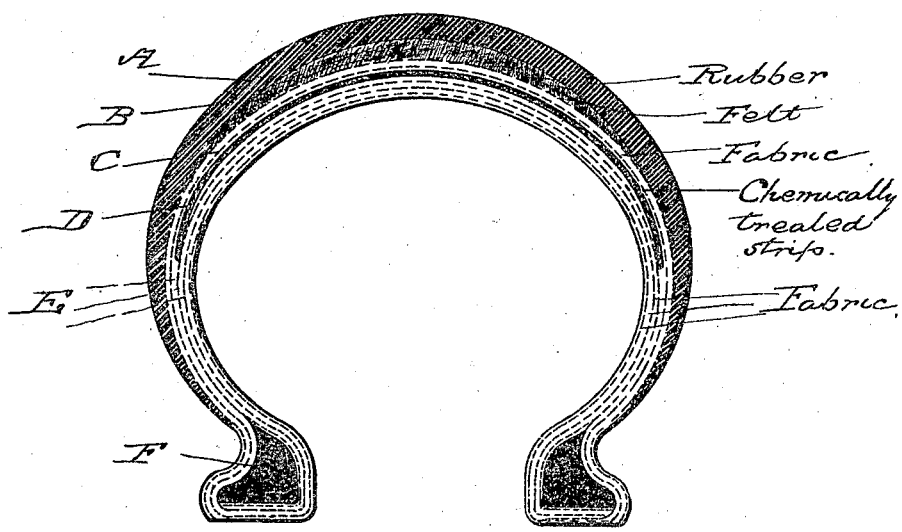

EDWIN F. MORSE, OF DES MOINES, IOWA, ASSIGNOR, BY DIRECT AND MESNE ASSIGNMENTS, OF FIFTEEN THIRTY-SECONDS TO WILLIAM F. KNAP, OF DES MOINES, IOWA, AND NINE THIRTY-SECONDS TO W. G. PARK, OF GALVESTON, TEXAS.

TIRE AND RELINER.

1,188,195.   Specification of Letters Patent.   Patented June 20, 1916.

Application filed April 5, 1915. Serial No. 19,188.

*To all whom it may concern:*

Be it known that I, EDWIN F. MORSE, a citizen of the United States, residing at Des Moines, in the county of Polk and State of Iowa, have invented certain new and useful Improvements in Tires and Reliners, of which the following is a specification.

My invention relates to improvements in tires and refers particularly to pneumatic tires such as used upon automobiles, the main object of my invention being the provision of a tire which will be practically proof against blowouts or punctures and which will withstand the most severe test or hardest usage and prove highly efficient.

Another object of my invention is the provision of a tire which will be puncture proof and which will possess the necessary resiliency under all conditions and character of service.

Another object of my invention is the provision of a tire which can be produced at a low cost, which will prove very durable and long-lived which will not be liable to punctures or blowouts and which will be entirely practical from every point of view.

With these objects in view my tire broadly stated consists of an outer rubber tread, a contiguous felt or pliable cushion, and an embedded strip made puncture proof by chemical treatment with inclosing strips of canvas or like fabric.

The invention further consists of a tire embodying novel features of construction and arrangement of its parts for service substantially as shown, described and claimed herein.

In order that the detailed construction of my invention may be fully understood and its many advantages be appreciated I have shown in the accompanying drawings a transverse sectional view of a tire constructed in accordance with and embodying my invention.

The tire is of the general shape and appearance of the pneumatic tires in general use and consists of the outer rubber tread surface A, the contiguous felt cushion B, the contiguous canvas or fabric strip C, the chemically treated puncture proof strip D, the series of layers of fabric or canvas E, and the flanges F, which fit and are secured to the rim.

I have found by practice and experience that the felt or cushion strip should be about five eighths of an inch in thickness and that the chemically treated strip gives the best results when about three eight. of an inch in thickness.

The arrangement shown and described disposing the rubber tread first, the felt strip second, canvas strips, preferably two layers, third, the non-puncturable chemically treated strip fourth, and the canvas strips fifth, imparts to the tire all the resiliency desired and that the chemically treated strip is proof against punctures. I have also found that should a sharp object be driven through the rubber, felt, canvas and strip that such object will be retained in place and the air will remain in the tire permitting its service during the life of the tire without requiring attention or repair.

The tire can be produced as cheaply as tires in general use and will be puncture proof, is light in weight and possesses the required elasticity and will prove desirable, efficient and practical in every respect.

I claim:

A tire of the character described, consisting of an elastic tread, a contiguous felt cushion strip, a fabric strip contiguous to the felt strip, a strip contiguous to the fabric strip and rendered puncture proof by chemical treatment, and a fabric strip inclosing the puncture proof strip, the whole being assembled to form a unitary tire structure.

In testimony whereof I affix my signature in presence of two witnesses.

EDWIN F. MORSE.

Witnesses:
 CHAS. A. POST,
 HENRY G. HILDEBRANDT.